(12) United States Patent
Weder et al.

(10) Patent No.: US 6,415,546 B2
(45) Date of Patent: *Jul. 9, 2002

(54) FLORAL GROUPING WITH HANDLE INCORPORATED THEREIN

(75) Inventors: Donald E. Weder; Joseph G. Straeter; John Bergstrand, all of Highland, IL (US)

(73) Assignee: Southpac Trust International, Inc.

( * ) Notice: Subject to any disclaimer, the term of this patent is extended or adjusted under 35 U.S.C. 154(b) by 2 days.

This patent is subject to a terminal disclaimer.

(21) Appl. No.: 09/899,644

(22) Filed: Jul. 5, 2001

Related U.S. Application Data (63) Continuation of application No. 09/520,296, filed on Mar. 7, 2000, now Pat. No. 6,295,758, which is a continuation of application No. 08/459,879, filed on Jun. 2, 1995, now abandoned, which is a division of application No. 08/092,678, filed on Jul. 16, 1993, now Pat. No. 5,509,251, which is a continuation-in-part of application No. 07/922,971, filed on Jul. 30, 1992, now abandoned, which is a continuation-in-part of application No. 07/803,318, filed on Dec. 4, 1991, now Pat. No. 5,344,016, which is a continuation-in-part of application No. 07/707,417, filed on May 28, 1991, now abandoned, which is a continuation of application No. 07/502,358, filed on Mar. 29, 1990, now abandoned, which is a continuation-in-part of application No. 07/391,463, filed on Aug. 9, 1989, now abandoned, which is a continuation-in-part of application No. 07/249,761, filed on Sep. 26, 1988, now abandoned.

(51) Int. Cl.[7] .................................................. A01G 5/00
(52) U.S. Cl. .......................................... 47/41.01; 47/72
(58) Field of Search .................. 47/41.01, 72; 206/423

(56) References Cited

U.S. PATENT DOCUMENTS

| | | | |
|---|---|---|---|
| 732,889 A | * | 7/1903 | Paver ............................. 47/72 |
| 923,663 A | | 6/1909 | Kroeger |
| 1,044,911 A | | 11/1912 | Renner |
| 1,979,771 A | | 11/1934 | Potter |
| 2,774,187 A | | 12/1956 | Smithers |
| 2,968,124 A | | 1/1961 | Coplen |
| 3,271,922 A | | 9/1966 | Wallerstein et al. |
| 3,430,845 A | | 3/1969 | Susuki et al. |
| 3,508,372 A | | 4/1970 | Wallerstein et al. |
| 3,748,781 A | | 7/1973 | Erling |
| 3,869,828 A | | 3/1975 | Matsumoto |
| 4,113,100 A | | 9/1978 | Soja et al. |
| 4,269,314 A | | 5/1981 | Barrash |
| 4,400,910 A | | 8/1983 | Koudstaal et al. |
| 4,546,875 A | | 10/1985 | Zweber |
| 4,713,839 A | | 12/1987 | Pepiatt |
| 4,765,464 A | | 8/1988 | Ristvedt |
| 4,773,182 A | | 9/1988 | Weder |
| 4,819,410 A | | 4/1989 | Skinner |
| 4,861,170 A | | 8/1989 | Patriksson |
| 5,048,687 A | | 9/1991 | Suzuki et al. |
| 5,079,900 A | | 1/1992 | Pinckney et al. |
| 5,111,638 A | | 5/1992 | Weder |
| 5,181,364 A | | 1/1993 | Weder |
| 5,235,782 A | | 8/1993 | Landau |
| 6,295,758 B1 | * | 10/2001 | Weder et al. .............. 47/41.01 |

FOREIGN PATENT DOCUMENTS

| | | | |
|---|---|---|---|
| DE | 11666992 | | 5/1962 |
| FR | 2036163 | | 12/1970 |
| FR | 2137325 A | * | 5/1971 |
| FR | 2137325 | | 12/1972 |
| FR | 2272914 | | 12/1975 |
| FR | 2643044 | | 8/1990 |
| GB | 2056410 | | 3/1981 |
| GB | 2074542 | | 11/1981 |
| NL | 8101464 | | 10/1982 |

* cited by examiner

Primary Examiner—Peter M. Poon
Assistant Examiner—Judith Nelson
(74) Attorney, Agent, or Firm—Dunlap, Codding & Rogers, P.C.

(57) ABSTRACT

A wrapper for wrapping about a floral grouping and a method for wrapping the floral grouping, the wrapper having a handle formed from a portion of the sheet of material for carrying the wrapper with the floral grouping disposed therein. The wrapper may comprise one or more sheets of material. The sheet may have more than one handle portion formed thereon.

14 Claims, 6 Drawing Sheets

FLORAL GROUPING WITH HANDLE INCORPORATED THEREIN

CROSS REFERENCE TO RELATED APPLICATIONS

This Application is a continuation of U.S. Ser. No. 09/520, 296, filed Mar. 7, 2000 now U.S. Pat. No. 6,295,758, entitled FLORAL GROUPING WRAPPER WITH HANDLE INCORPORATED THEREIN; which is a continuation of U.S. Ser. No. 08/459,879, filed Jun. 2, 1995, entitled FLORAL GROUPING WRAPPER WITH HANDLE INCORPORATED THEREIN, now abandoned; which is a divisional of Ser. No. 08/092,678, filed Jul. 16, 1993, entitled METHOD OF WRAPPING A FLORAL GROUPING USING A WRAPPER WITH A HANDLE, now U.S. Pat. No. 5,509,251; which is a continuation-in-part of U.S. Ser. No. 07/922,971, filed Jul. 30, 1992, entitled A WRAPPER WITH HANDLE FOR WRAPPING A FLORAL GROUPING AND METHOD, now abandoned; which is a continuation-in-part of U.S. Ser. No. 07/803,318, filed Dec. 4, 1991, entitled WRAPPING MATERIAL FOR WRAPPING A FLORAL GROUPING HAVING STAGGERED STRIPS OF ADHESIVE APPLIED THERETO AND METHOD, now U.S. Pat. No. 5,344,016; which is a continuation-in-part of U.S. Ser. No. 07/707,417, filed May 28, 1991, entitled WRAPPING A FLORAL GROUPING WITH SHEETS HAVING ADHESIVE OR COHESIVE MATERIAL APPLIED THERETO, now abandoned; which is a continuation of U.S. Ser. No 07/502,358, filed Mar. 29, 1990, entitled WRAPPING A FLORAL GROUPING WITH SHEETS HAVING ADHESIVE OR COHESIVE MATERIAL APPLIED THERETO, now abandoned, which is a continuation-in-part of U.S. Ser. No. 07/391,463, filed Aug. 9, 1989, entitled ADHESIVE APPLICATOR, now abandoned; which is a continuation-in-part of U.S. Ser. No. 07/249,761, filed Sep. 26, 1988, now abandoned, entitled METHOD FOR WRAPPING AN OBJECT IN A MATERIAL HAVING PRESSURE SENSITIVE ADHESIVE THEREON.

FIELD OF THE INVENTION

The present invention relates generally to a wrapper for a floral grouping and, more particularly, but not by way of limitation, to a sheet of material wrapped about a floral grouping to form a wrapper with a handle formed in the sheet of material or connected to the sheet of material to form a handle for the wrapper for carrying the wrapper with the floral grouping disposed therein.

SUMMARY

The present invention comprises a method for wrapping a floral grouping. The first step is providing a sheet of material having an upper surface, a lower surface, a first end, a second end, a first side and a second side. The sheet of material has a closure bonding material disposed on at least one of the upper and the lower surfaces thereof. Furthermore, the sheet of material has a handle integral to the sheet of material, the handle comprising a portion of the sheet of material and extending from near the first end of the sheet of material.

The next step is providing a floral grouping having a stem end and a bloom end. This is followed by the step of disposing the floral grouping on the upper surface of the sheet of material, then wrapping the sheet of material about the floral grouping and disposing the closure bonding material adjacent a portion of the sheet of material whereby the closure bonding material bondingly engages with and connects to an adjacent portion of the sheet of material for cooperating to secure the sheet of material as a wrapper about the floral grouping. The wrapper thus wrapped has an open upper end and an open lower end and with the handle being disposed near the open upper end of the wrapper. The handle can then be grasped for carrying the wrapper with the floral grouping disposed therein.

The present invention further comprises an article of manufacture comprising a wrapper for wrapping a floral grouping. The wrapper comprises a sheet of material having an upper surface, a lower surface, a first end, a second end, a first side and a second side. The sheet of material has a closure bonding material disposed on at least one of the upper and the lower surfaces thereof, and the sheet of material has a handle integral to the sheet of material, the handle comprising a portion of the sheet of material and extending from near the first end of the sheet of material.

DESCRIPTION

The present invention comprises a method for wrapping a floral grouping. The first step is providing a sheet of material having an upper surface, a lower surface, a first end, a second end, a first side and a second side, a first width near the first end and extending generally from the first side to the second side, and a second width near the second end and extending generally from the first side to the second side. The sheet of material has a closure bonding material disposed on at least one of the upper and the lower surfaces thereof. Furthermore, the sheet of material has a handle integral to the sheet of material, the handle comprising a portion of the sheet of material and extending from near the first end of the sheet of material.

The next step is providing a floral grouping having a stem end and a bloom end. This is followed by the step of disposing the floral grouping on the upper surface of the sheet of material, then wrapping the sheet of material about the floral grouping and disposing the closure bonding material adjacent a portion of the sheet of material whereby the closure bonding material bondingly engages with and connects to an adjacent portion of the sheet of material for cooperating to secure the sheet of material as a wrapper about the floral grouping. The wrapper thus wrapped has an open upper end and an open lower end and with the handle being disposed near the open upper end of the wrapper. The handle can then be grasped for carrying the wrapper with the floral grouping disposed therein.

The sheet of material used in the method is defined as providing the sheet of material constructed of a material selected from a group of materials consisting of a polymer film, metal foil, fiber (woven or unwoven or natural or synthetic), burlap, paper (untreated or treated in any manner) or combinations thereof. The sheet of material has a thickness in a range from about 0.1 mils to about 30 mils. More preferably the sheet has a thickness in a range from about 0.1 mils to about 5 mils.

The sheet used in the method described above preferably has a closure bonding material disposed at least near the first side and extending generally between the first end and the second end of the sheet of material. The step of wrapping the sheet of material about the floral grouping to form the wrapper may further comprise wrapping the sheet of material about the floral grouping to form the wrapper and wrapping the sheet of material tightly about the stem end of the floral grouping. Alternatively the wrapping step may be defined further as wrapping the sheet of material about the floral grouping to form the wrapper and tightly wrapping the sheet of material about the stem end with a portion of the stem end of the floral grouping extending through the open lower end of the wrapper.

In the wrapping step of the sheet of material may be wrapped about the floral grouping to form the wrapper with the wrapper being generally conically shaped, or alternatively generally cylindrically shaped. In the step of providing the sheet of material, the first width of the sheet may be greater than the second width of the sheet. Alternatively, the first width of the sheet may. be substantially equal to the second width of the sheet. Further, in the step of providing the sheet of material the handle of the sheet of material may further comprise a reinforcing member for providing additional. strength to the handle. The sheet of material may have a decoration disposed thereupon. Further, in the step of providing the sheet of material, the sheet of material may comprise a portion of a roll of material wherein the sheet of material can be detachably or severingly removed from the roll of material.

The method may comprise the additional step of providing a second sheet of material having an upper surface, a lower surface, a first end, a second end, a first side and a second side, a first width near the first end extending generally from the first side to the second side, and a second width near the second end extending generally from the first side to the second side, and wherein the second sheet of material is disposable upon a portion of the upper surface of the first sheet of material in such a way that the handle of the first sheet of material is left uncovered by the second sheet of material. Further the first width of the second sheet of material may be less than the first width of the first sheet of material and the second width of the second sheet of material may be less than the second width of the first sheet of material.

The method may comprise the additional step of providing a second sheet of material having a handle comprising a portion of the second sheet of material and extending from near the first end of the second sheet of material. Additionally, the first width of the second sheet of material may be less than the first width of the first sheet of material and the second width of the second sheet of material may be less than the second width of the first sheet of material.

In the step of providing the second sheet of material the handle of the second sheet of material may further comprise a reinforcing member for providing additional strength to the handle. Also, in the step of providing the sheet of material, the sheet of material may comprise a second handle disposed in a position adjacent the first handle. When the sheet has a second handle during the wrapping step, the second handle may be aligned with the first handle in such a manner that the first handle and the second handle are substantially superimposed upon one another. Alternatively, in the wrapping step, the second handle may be aligned opposite to the first handle in such a manner that the first handle and the second handle are substantially opposite one another.

An additional step is providing a second sheet of material having an upper surface, a lower surface, a first end, a second end, a first side and a second side, a first width near the first end extending generally from the first side to the second side, and a second width near the second end extending generally from the first side to the second side, and wherein the sheet of material is disposable upon a portion of the upper surface of the first sheet of material in such a way that the first handle and the second handle of the first sheet of material is left uncovered by the second sheet of material when the second sheet of material is disposed upon the first sheet of material.

A further additional step is providing a second sheet of material having an upper surface, a lower surface, a first end, a second end, a first side and a second side, a first width near the first end extending generally from the first side to the second side, and a second width near the second end extending generally from the first side to the second side, and wherein the second sheet of material has a first handle comprising a portion of the second sheet of material and extending from near the first end of the second sheet of material and wherein the second sheet of material has a second handle comprising a portion of the second sheet of material and extending from near the first end of the second sheet of material and positioned adjacent the first handle of the second sheet of material.

The present invention further comprises an article of manufacture comprising a wrapper for wrapping a floral grouping. The wrapper comprises a sheet of material having an upper surface, a lower surface, a first end, a second end, a first side and a second side, a first width near the first end and extending generally from the first side to the second side, and a second width near the second end and extending generally from the first side to the second side. The sheet of material has a closure bonding material disposed on at least one of the upper and the lower surfaces thereof, and the sheet of material has a handle integral to the sheet of material, the handle comprising a portion of the sheet of material and extending from near the first end of the sheet of material.

In one version, the first width of the sheet is greater than the second width of the sheet. In another version, the first width of the sheet is substantially equal to the second width of the sheet. The handle of the sheet of material may further comprise a reinforcing member for providing additional strength to the handle. Also, the sheet of material may have a decoration disposed thereupon.

The wrapper may further comprise a second sheet of material having an upper surface, a lower surface, a first end, a second end, a first side and a second side, a first width near the first end extending generally from the first side to the second side, and a second width near the second end extending generally from the first side to the second side, and wherein the second sheet of material is disposable upon a portion of the upper surface of the first sheet of material in such a way that the handle of the first sheet of material is left uncovered by the second sheet of material.

In such a second sheet of material, the first width of the second sheet of material may be less than the first width of the first sheet of material and the second width of the second sheet of material may be less than the second width of the first sheet of material.

Alternatively, the second sheet of material may also have a handle comprising a portion of the second sheet of material and extending from near the first end of the second sheet of material. The handle of the second sheet of material may further comprise a reinforcing member for providing additional strength to the handle. Further, the sheet of material may comprise a second handle disposed in a position adjacent the first handle. The second handle may be alignable with the first handle in such a manner that the first handle and the second handle are substantially superimposed upon one another. Alternatively, the second handle may be alignable opposite to the first handle in such a manner that the first handle and the second handle are substantially opposite one another.

Figure 1:
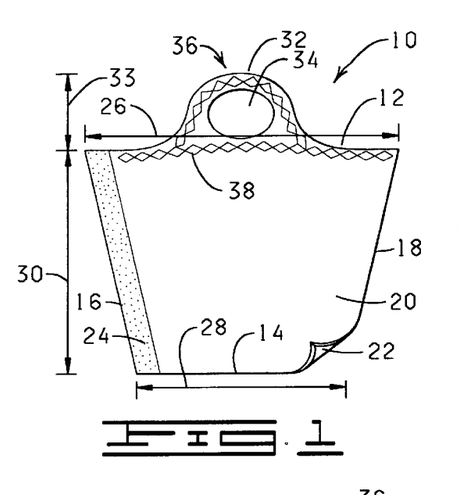
FIG. 1 is a plan view of a first sheet of material with one end turned up and constructed in accordance with the present invention.
Figure 2:
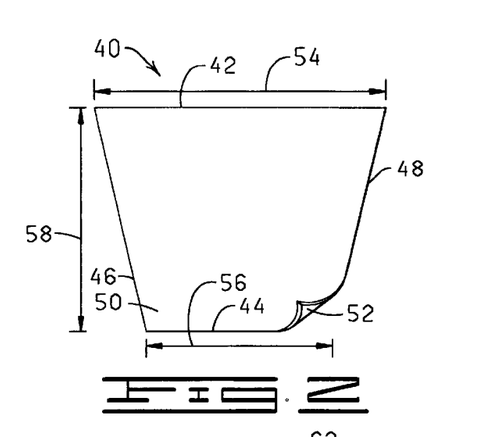
FIG. 2 is a plan view of a second sheet of material with one end turned up and constructed in accordance with the present invention.
Figure 3:
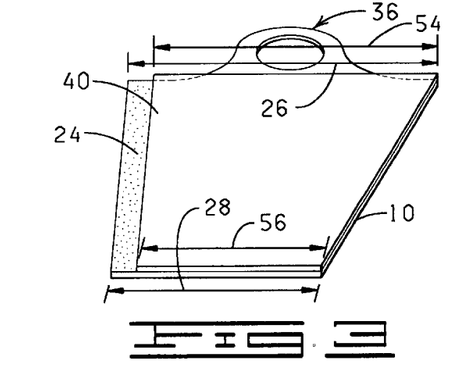
FIG. 3 is a perspective view showing the first and the second sheets of material of FIGS. 1 and 2 disposed upon each other.

The Embodiments of FIGS. 1–3

Shown in FIG. 1 and designated therein by the general reference numeral 10 is a sheet of material. The sheet of material 10 has a first end 12, a second end 14, a first side 16, a second side 18, an upper surface 20 and a lower surface 22.

A closure bonding material 24 is disposed on a portion of the upper surface 20 of the sheet of material 10. As shown in FIG. 1, the closure bonding material 24, is disposed in a preferred embodiment adjacent the first side 16 of the sheet of material 10 and extends between the first end 12 and the second end 14 of the sheet of material 10. As shown in FIG. 1, the closure bonding material 24 is disposed on the upper surface 20 in a strip of closure bonding material 24, although the closure bonding material 24 also could be applied to the upper surface 20 of the sheet of material 10 in the form of spaced apart spots or the closure bonding material 24 also could be disposed on the upper surface 20 of the sheet of material 10 in other geometric forms upon portions of the upper surface 20 of the sheet of material 10. The term "spot" or "spots" includes any geometric shape of spot including, but not limited to, what is commonly referred to as strips.

The sheet of material 10 has a thickness in a range from about 0.1 mils to about 30 mils. Preferably, the sheet of material 10 has a thickness in a range from about 0.1 mils to about 5 mils. The first sheet of material 10 is constructed of a flexible material.

The sheet of material 10 may be any shape and a trapezoidal shape is shown in FIG. 1 only by way of example. The sheet of material 10 for example only may be square, rectangular, triangular, circular or any other geometric shape such as heart shaped, for example only.

The sheet of material 10 may be constructed of a single layer of material or a plurality of layers of the same or different types of materials. Any thickness of the sheet of material 10 may be utilized in accordance with the present invention as long as the sheet of material 10 is wrappable about an object, such as a floral grouping or plant as described herein. The layers of material comprising the sheet of material 10 may be connected together or laminated or may be separate layers, and the layers of material comprising the sheet of material 10 need not be uniform in shape or composition.

The sheet of material 10 has a first width 26 extending from the first side 16 to the second side 18 located generally near the first end 12, and a second width 28 extending from the first side 16 to the second side 18 and located generally near the second end 14 of the sheet 10. The first width 26 is greater than the second width 28. The sheet of material 10 also has a length extending from the first end 12 to the second end 14 which is sufficiently long to substantially surround and enclose a floral grouping when wrapped about such a floral grouping, which is described in greater detail below.

The sheet of material 10 further has an extension 32 which extends laterally a distance 33 from the first end 12 of the sheet. The extension 32 has an opening 34 located therein and the extension 32 and the opening 34 in the extension 32 together comprise a handle 36. The sheet of material 10 may be further decorated with a decorative pattern 38 located about the handle 36 or any other portion of the sheet of material 10.

The sheet of material 10 may be used alone to wrap a floral grouping or plant, as will be described in more detail below, or the sheet 10 may be used with at least a second sheet when used to wrap a floral grouping.

Referring now to FIG. 2, a second sheet of material is designated by the general reference numeral 40.

The second sheet of material 40 has a first end 42, a second end 44, a first side 46, a second side 48, an upper surface 50 and a lower surface 52. The second sheet of material is preferably constructed of paper although it may be constructed of any material as defined herein. The term "paper" as used herein means treated or untreated paper, corrugated paper or cardboard or any other form of paper material.

The second sheet of material 40 has a first width 54 extending between the first side 46 and the second side 48 and generally near the first end 42 of the second sheet of material 40. The second sheet of material 40 has a second width 56 extending between the first side 46 and the second side 48 an generally near the second end 44 of the second sheet of material 40. The first width 54 of the second sheet of material 40 is greater than the second width 56 of the second sheet of material 40. The second sheet of material 40 has a length 58 which extends from the first end 42 to the second end 44 of the sheet 40.

The second sheet of material 40 has a thickness in a range from 0.1 mils to about 30 mils and preferably in a range from about 0.1 mils to about 10 mils. The second sheet of material 40 is flexible, but may be relatively rigid compared to the first sheet of material.

The second sheet of material 40 may be any shape and a trapezoidal shape is shown in FIG. 2 only by way of example. The second sheet of material for example only may be square, rectangular, circular or any other geometric shape.

The second sheet of material 40 may be constructed of a single layer of materials or a plurality of layers of the same or different types of materials. Any thickness of the second sheet of material 40 may be utilized in accordance with the present invention as long as the second sheet of material 40 is wrappable about an object such as a floral grouping or a plant, as described herein, and as long as the second sheet of material 40 provides the rigidity described herein or the absorbency described herein or both. The layers of material comprising the second sheet of material 40 may be connected together or laminated or may be separate layers.

In general the length 30 of the sheet 10 is substantially equal to the length 58 of the sheet 40. Also, in general the first width 26 of the sheet 10 is wider than the first width 54 of the sheet 40. Also, the second width 28 of the sheet 10 is wider than the second width 56 of the sheet 40. As a result, when the second sheet 40 is disposed upon the first sheet 10 as shown in FIG. 3, the closure bonding material 24 on the sheet 10 is left substantially uncovered by the sheet 40.

In this position, the lower surface 52 of the second sheet of material 40 is disposed adjacent the upper surface 20 of the first sheet of material 10. The first end 42 of the second sheet of material 40 is generally aligned with the first end 12 of the first sheet of material 10, the second end 44 of the second sheet of material 40 is generally aligned with the second end 14 of the first sheet of material 10, the second side 18 of the first sheet of material 10 is generally aligned with the second side 48 of the second sheet of material 40 and the first side 16 of the first sheet of material 10 extends a distance beyond the first side 46 of the second sheet of material 40 so that the closure bonding material 24 on the upper surface 20 of the first sheet of material 10 is exposed and not covered by the second sheet of material 40.

When the second sheet 40 is disposed upon the upper surface 20 of the sheet of material 10 the handle 36 is left uncovered by the second sheet 40, as generally indicated in FIG. 3.

As noted above, a closure bonding material is disposed on the upper surface 20 of the first sheet of material 10. The closure bonding material 24 may be applied as a strip or as spots or other shapes. One method for disposing a closure bonding material, in this case an adhesive, is described in U.S. Pat. No. 5,111,637 entitled "Method For Wrapping A Floral Grouping" issued to Weder et al., on May 12, 1992 and which is hereby incorporated herein by reference.

The first sheet of material 10 can be utilized alone or in combination with the second sheet of material 40 to wrap a floral grouping or plant. "Floral grouping" as used herein means cut fresh flowers, artificial flowers, a single flower other fresh and/or artificial plants or other floral materials and may include other secondary plants and/or ornamentation or artificial or natural materials which add to the aesthetics of the overall floral arrangement. The floral grouping comprises a bloom or foliage portion and a stem portion. However, it will be appreciated that the floral grouping may consist of only a single bloom or only foliage (not shown). The term "floral grouping" may be used interchangeably herein with the term "floral arrangement".

The first sheet of material 10 or the second sheet of material 40 may be constructed of a single layer of material or a plurality of layers of the same or different types of materials. Any thickness of the sheet of material 10 or 40 may be utilized in accordance with the present invention as long as the sheet of material 10 or 40 may be wrapped or formed about at least a portion of a portion of a flower pot or a floral grouping, as described herein. Additionally, an insulating material such as bubble film, preferable as one of two or more layers, can be utilized in order to provide additional protection for the item wrapped therein.

In a preferred embodiment, the first sheet of material 10 is constructed from two polypropylene films (a 20"×15" sheet of Mobil 270 ABW white opaque film laminated to a 20"×15" sheet of Mobil 220 AB clear film) having a thickness in a range of from less than about 1.0 mil to about 2.5 mils. The layers of material comprising the first sheet of material 10 may be connected together or laminated or may be separate layers.

The sheet of material 10 is constructed from any suitable wrapping material that is capable of being wrapped about a floral grouping. Preferably, the wrapping material 10 comprises paper (untreated or treated in any manner), metal foil, polymer film, fabric (woven or nonwoven or synthetic or natural), burlap, or combinations thereof.

The term "polymer film" means a man-made polymer such as a polypropylene or a naturally occurring polymer such as cellophane. A polymer film is relatively strong and not as subject to tearing (substantially non-tearable), as might be the case with paper or foil.

The sheet of material 10 or 40 may vary in color. Further, the sheet of material 10 or 40 may consist of designs or decorative patterns which are printed, etched, and/or embossed thereon using inks or other printing materials. An example of an ink which may be applied to the surface of the sheet of material 10 or 40 is described in U.S. Pat. No. 5,147,706 entitled "Water Based Ink on Foil And/Or synthetic organic polymer" issued to Kingman on Sep. 15, 1992 and which is hereby incorporated herein by reference. In addition, the sheet of material 10 or 40 may have various colorings, coatings, flocking and/or metallic finishes, or other decorative surface ornamentation applied separately or simultaneously or may be characterized totally or partially by pearlescent, translucent, transparent, iridescent or the like, qualities. Each of the above-named characteristics may occur alone or in combination and may be applied to the upper and/or lower surface of the sheet of material 10 or 40. Moreover, each surface of the sheet of material 10 or 40 may vary in the combination of such characteristics. The sheet of material 10 or 40 itself may be opaque, translucent or partially clear or tinted transparent.

Embodiments of FIGS. 4–7

Figure 4:
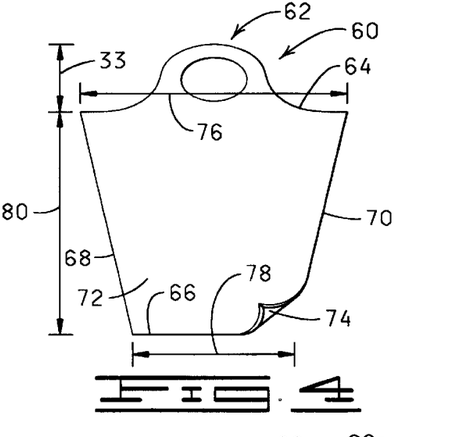
FIG. 4 is a second sheet of material similar to the second sheet of FIG. 2 but having a handle.
Figure 5:
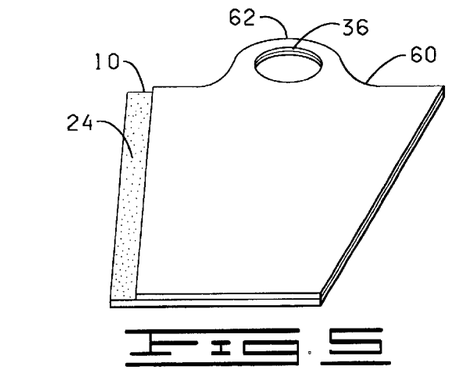
FIG. 5 is a perspective view of the sheet of FIG. 4 disposed upon the sheet of FIG. 1.

Referring now to FIGS. 4 and 5, a sheet of material is designated by the general reference numeral 60. The sheet 60 has a handle 62, a first end 64, a second end 66, a first side 68, a second side 70, an upper surface 72 and a lower surface 74. The sheet 60 has a first width 76, a second width 78 and a length 80. The sheet 60 is exactly the same as the sheet 10 with the exception that the sheet 60 lacks a closure bonding material on a portion of the sheet 60 such as the closure bonding material 24 on a portion of sheet 10, and that the first width 76 and the second width 78 of the sheet 60 are less than the first width 26 and the second width 28, respectively, of the sheet 10.

When sheet 60 is overlaid and disposed upon the upper surface 20 of sheet 10, as shown in FIG. 5, the sheet 60 and 10 appear exactly like sheets 20 and 40 in FIG. 3 except that sheet 60 has a handle 62 which is superimposed upon the handle 36 of sheet 10. The closure bonding material 24 is left exposed when sheet 60 is superimposed upon sheet 10 such that the second side 70 of sheet 60 is superimposingly aligned with the second side 18 of sheet 10.

Figure 6:
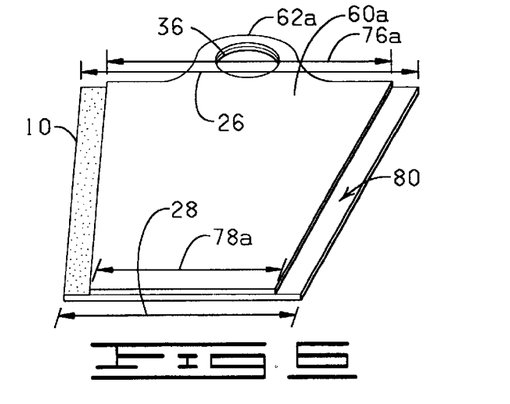
FIG. 6 is a perspective vie of another sheet disposed upon the sheet of FIG. 1.

Referring now to FIG. 6, a sheet of material 60a is shown as disposed upon the upper surface 20 of the sheet of material 10. The sheet of material 60a is exactly the same as the sheet of material 60 except that the first width 76a and the second width 78a are less than the widths 76 and 78 of sheet 60. As a result, when the sheet 60a is disposed upon the sheet 10, and the handle 62a of the sheet 60 is superimposed upon the handle 36 of sheet 10, a strip 80 of sheet 10 which extends from the first end 12 of sheet 10 to the second end 14 of sheet 10 is left uncovered by the sheet 60a.

Figure 7:
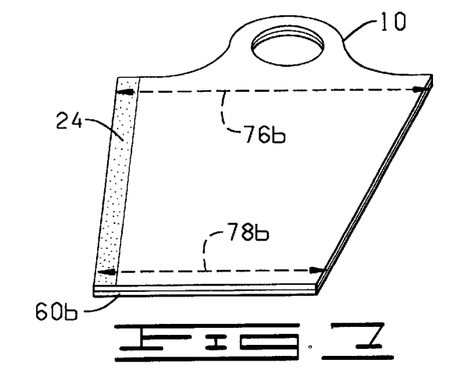
FIG. 7 is a perspective view of another first sheet and second sheet disposed upon one another.

Referring now to FIG. 7, sheet of material 10 is shown superimposingly aligned upon a sheet of material 60b, the sheet of material 60b disposed underneath the sheet 10. The sheet of material 60b is exactly the same as the sheet of material 60 except that the first width 76b of the sheet 60b is substantially the same as the corresponding first width 26 of sheet 10 and the second width 78b of the sheet 60 is substantially the same as the corresponding second width 28 of the sheet 10. As a result the sheet 60b and sheet 10 are in substantial alignment along each side and end and long the handle wherein sheet 10 is substantially entirely superimposed upon the sheet 60b.

Embodiments of FIGS. 8–12

In another version of the invention, a bonding material may be applied to either the upper surface of a first sheet of material or to the lower surface of a second sheet of material in a plurality of patches for the purpose of bonding the upper surface of the first sheet to the lower surface of the second sheet.

Figure 8:
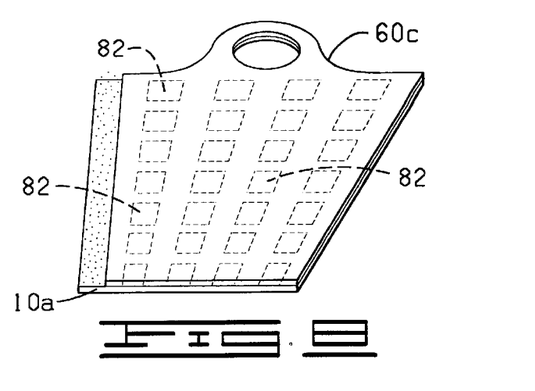
FIG. 8 is a perspective view showing bonding areas on the surface of a first sheet or a second sheet which cause bonding of the second sheet and the first sheet.

For example, referring now to FIG. 8, a first sheet and a second sheet are designated by the general reference numerals 10a and 60c, respectively. The first sheet 10a and the second sheet 60c are, respectively, exactly the same as sheets 10 and 60 except that at least either sheet 10a, or sheet 60c, or both sheets 10a and 60c have a plurality of patches 84 of bonding material disposed thereon for connecting the upper surface of sheet 10a to the lower surface of sheet 60c.

Shown in FIGS. 9–12 are several alternative ways in which a first sheet and a second sheet may be bonded together in the present invention.

Figure 9:
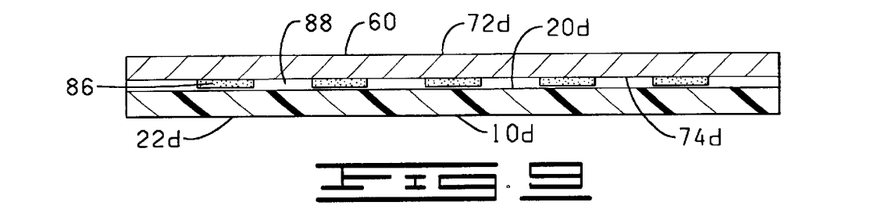
FIG. 9 is a sectional view of a modified first and second sheets of material.

Shown in FIG. 9 is a modified first sheet of material 10d connected to a modified second sheet of material 60d. The first sheet of material 10d is constructed exactly like the sheet of material 10. The second sheet of material 60d is constructed like the sheet of material 60 described in detail before and shown in FIG. 4, except the second sheet of material 60d includes a bonding material 86 disposed on the lower surface 74d of the second sheet of material 60d. The bonding material 86 is in the form of a plurality of spaced apart spots of bonding material 86, similar to that shown in FIG. 8. The lower surface 74d of the second sheet of material 60d is bondingly connected to the upper surface 20d of the first sheet of material 10d by way of the bonding material 86. Since the bonding material 86 is in the form of a plurality of spaced apart spots, a plurality of spaced apart spaces 88 (only one of the spaces 88 being designated by reference numeral in FIG. 9) are formed between the lower surface 74d of the second sheet of material 60d and the upper surface 20d of the first sheet of material 10d. The spaces 88 provide air gaps which form an insulation when the first and the second sheets of material 10d and 60d are wrapped about a floral grouping in a manner and for reasons like that described herein.

Figure 10:
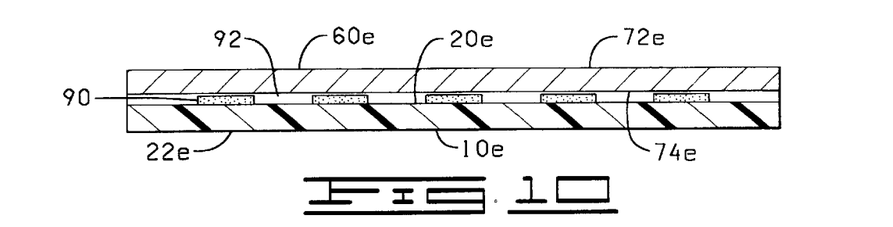
FIG. 10 is another cross-sectional view of a modified first sheet of material connected to a modified second sheet of material.

Shown in FIG. 10 is a modified first sheet of material 10e connected to a modified second sheet of material 60e. The first sheet of material 10e is constructed exactly like the sheet of material 10 shown in FIG. 1, except the first sheet of material 10e includes a bonding material 90 disposed on the upper surface 20e of the first sheet of material 10e. The bonding material 90 is in the form of a plurality of spaced apart spots of bonding material 90, similar to that shown in FIG. 9. The lower surface 74e of the second sheet of material 60e is bondingly connected to the upper surface 20e of the first sheet of material 10e by way of the bonding material 90. Since the bonding material 90 is in the form of a plurality of spaced apart spots, a plurality of spaces 92 (only one of the spaces 92 being designated by a reference numeral in FIG. 10) are formed between the lower surface 74e of the second sheet of material 60e and the upper surface 20e of the first sheet of material 10e. The spaces 92 provide air gaps which form an insulation when the first and the second sheets of material 10e and 60e are wrapped about a floral grouping in a manner and for reasons like that described herein in connection with FIG. 9.

Figure 11:
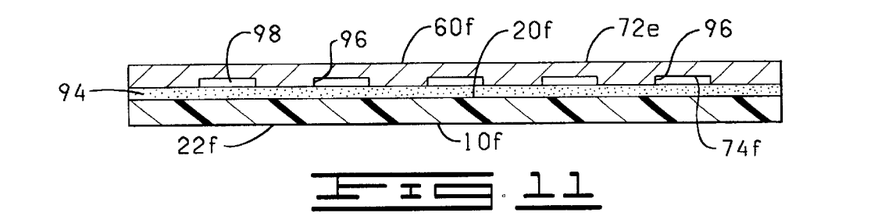
FIG. 11 is a cross sectional view of still another modified first sheet of material connected to a modified second sheet of material.

Shown in FIG. 11 is a modified first sheet of material 10f connected to a modified second sheet of material 60f. The first sheet of material 10f is constructed exactly like the sheet of material 10 shown in FIG. 1, except the first sheet of material 10f includes a bonding material 94 on the upper surface 20f thereof. The second sheet of material 60f is constructed exactly like the second sheet of material 60 shown in FIG. 4, except the second sheet of material 60f includes a plurality of spaced apart raised portions 96. The raised portions 96 may be formed by embossing the second sheet of material 60f or forming corrugations in the second sheet of material 60f or in any other manner desired in any particular application.

The upper surface 20f of the first sheet of material 10f is disposed generally adjacent the lower surface 74f of the second sheet of material 60f or, more particularly, adjacent the raised portions 96 on the second sheet of material 60f. In this position, the raised portions 96 are bonded to the upper surface 20f of the first sheet of material 10f by way of the bonding material 94 to connect the first sheet of material 10f to the second sheet of material 20f.

The spaced apart raised portions 96 on the second sheet of material 60f form a plurality of spaces 98 between the first sheet of material 10f and the second sheet of material 60f in a connected position of the first and the second sheets of material 10f and 60f for providing insulation when the first and second sheets of material 10f and 26f are connected together and wrapped about a floral grouping in a manner like that described herein.

Figure 12:
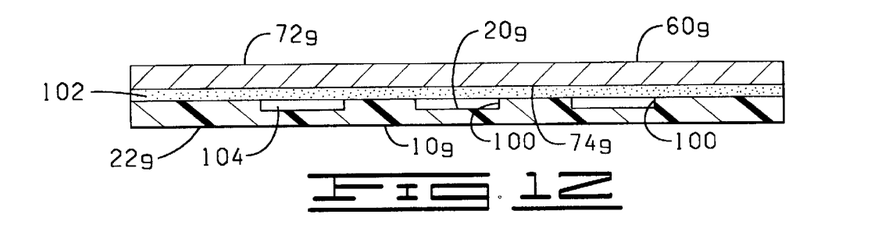
FIG. 12 is another cross-sectional view of yet another modified first sheet of material connected to a modified second sheet of material.

Shown in FIG. 12 is a modified first sheet of material log connected to a modified second sheet of material 60g. The first sheet of material 10g is constructed exactly like the sheet of material 10 shown in FIG. 1, except the first sheet of material log includes a plurality of spaced apart raised portions 100. The raised portions 100 may be formed in the first sheet of material log by embossing the first sheet of material log or forming corrugations in the first sheet of material log or in any other suitable manner. The second sheet of material 60g is constructed exactly like the second sheet of material 60 shown in FIG. 4, except the second sheet of material 26g includes a bonding material 102 disposed on the lower surface 74g thereof.

In operation, the upper surface 20g of the first sheet of material 10g is disposed generally adjacent the lower surface 74g of the second sheet of material 60g or, more particularly, the raised portions 100 on the first sheet of material log are disposed adjacent the lower surface 74g of the second sheet of material 60g. In this position, the first sheet of material log is bondingly connected to the second sheet of material 60g by way of the bonding material 102 on the second sheet of material 60g or, more particularly, the bonding material 102 on the second sheet of material 60g bondingly engages and bondingly connects to the raised portions 100 on the first sheet of material log to connect the first sheet of material log to the second sheet of material 60g. In this connected position of the first sheet of material 10g and the second sheet of material 60g, the raised portions 100 cooperate to form a plurality of spaces 104. Between the first sheet of material 10g and the second sheet of material 60g. The spaces 104 a cooperate to provide an insulation when the first and the second sheets of material 10g and 60g are wrapped about a floral grouping or a flower pot in a manner and for reasons like that described herein.

Figure 13:
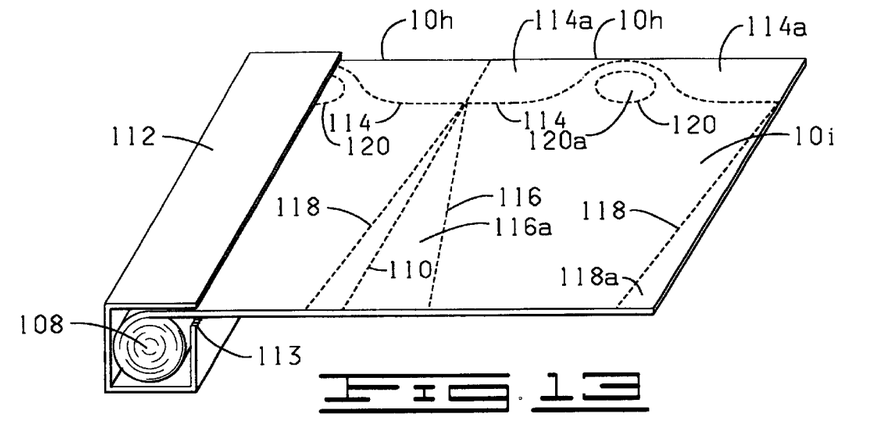
FIG. 13 is a diagrammatic view of a plurality of sheets of material, constructed in accordance with the present invention forming a continuous roll, the roll disposed in a dispenser and partially unrolled to reveal a single sheet still attached thereto.

Embodiment of FIG. 13

Referring now to FIG. 13, a plurality of individual sheets of material 10h are connected linearly together to form a roll 108. Preferably, the plurality of sheets of material 10h in the roll 108 are connected by perforations 110, as illustrated in FIG. 13. Such a roll 108 permits one sheet of material 10h to be withdrawn from the roll 108, then severed or disconnected from the roll 108. Alternatively, the roll 108 may simply be formed as a continuous roll 108 of wrapping material without perforations, wherein a plurality of sheets of material 10h may be removed from the roll 108 by unrolling a portion of the roll 108, and using a separate cutting element to sever the unrolled portion of the roll 108 of material to form the sheet of material 10h. The roll 108 may also be contained within a dispenser 112, as illustrated in FIG. 13. When the roll 108 is disposed in the dispenser 112, a portion of the wrapping material is again unrolled, and a serrated cutting edge 113 contained within the dispenser 112, or a separate cutting element (not shown), severs the unrolled portion of the wrapping material from the roll 108 to form a sheet of material 10h. Any number of sheets of material 10h may form the roll 108 as long as it is possible to withdraw at least one sheet 10h from the roll 108 as described herein.

Each sheet 10h further comprises a plurality of perforations for allowing the detachment of portions of sheet 10h thereby providing a sheet 10i constructed in accordance with the present invention. For example, as shown in FIG. 13, the sheet 10h has perforations 114 for detaching a sheet portion 114a from sheet 10h. Sheet 10h also has perforations 116 for detaching a sheet portion 116a from sheet 10h. Sheet 10h also has perforations 118 for detaching a sheet portion 118a from sheet 10h. Sheet 10h also has perforations 120 for detaching a sheet portion 120a from sheet 10h. After sheet portions 114a, 116a, 118a and 120a have been detached, the sheet 10i is available for use in accordance with the present invention. If desired, bonding material can be applied to a portion of the sheet 10i for enabling the wrapping of the sheet 10i together to hold sheet 10i in a wrapped position about the floral grouping as is described in more detail below. One method of applying an adhesive strip is to use an adhesive applicator system such as that described in U.S. Pat. No. 5,111,637, issued on May 12, 1992, to Weder et al., and entitled "Method for Wrapping a Floral Grouping", the specification of which is hereby incorporated herein by reference.

Figure 14:
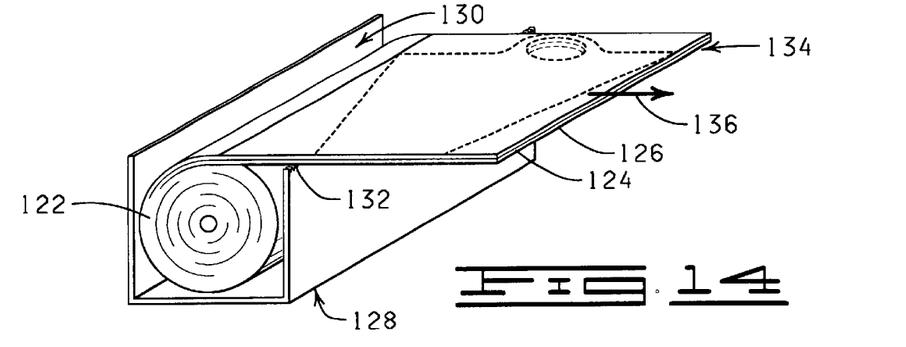
FIG. 14 is a diagrammatic view of a plurality of sheets of material forming a continuous double-layered roll of material disposed in a dispenser.
Figure 15:
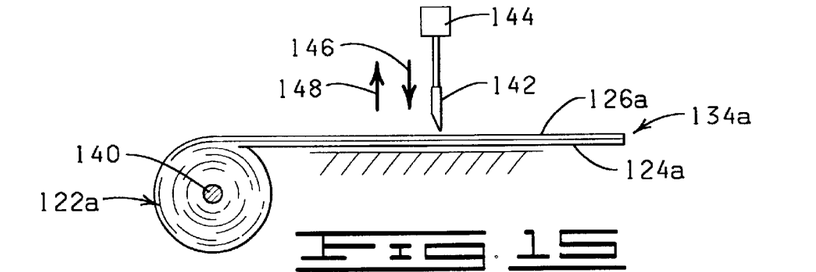
FIG. 15 is a diagrammatic view of a roll of material for severingly dispensing a first and a second sheet of material constructed in accordance with the present invention from the roll of material.

Embodiments of FIGS. 14–15

The first and the second sheets of material described herein can be provided in the form of a roll of first and second sheets of material wherein the first and the second sheets of material are unrolled from the roll of first and second sheets of material and the first and the second sheets of material are severed from the roll either by perforations at spaced apart locations in the roll or by cutting the first and the second sheets of material from the roll. It also should be noted that additional sheets of material may be combined with the first and the second sheets of material if so desired in a particular application.

Shown in FIG. 14 is a roll of material 122 comprising a first material 124 and a second material 126 with the second material 126 being disposed superimposingly upon the first material 124. The first material 124 is constructed of any of the materials described before with respect to a first sheet of material. The second material 126 is constructed of any of the materials described before with respect to a second sheet of material.

The roll of material 122 is disposed in a dispenser 128 having an opening 130 through which the materials 124 and 126 may be withdrawn from the roll of material 122. A cutting edge 132 is disposed on the dispenser 128 near the opening 130. The cutting edge 132 may be a sawtooth type of edge, as shown in FIG. 14, or the cutting edge 132 may be any other type of edge or device suitable for cutting a portion of the materials 124 and 126 from the roll of material 122 and the cutting edge 132 may be connected to the dispenser 128 or may be a separate component if desired in particular application.

The roll of material 122 has a leading edge 134. In operation, the leading edge 134 is gripped or a portion of the first and/or second materials are gripped and the first and the second materials are unrolled and withdrawn from the roll of material 122 in a direction 136. The first and the second materials 124 and 126 are withdrawn or unrolled from the roll of material 122 until a desired length of the first and the second materials 124 and 126 have been withdrawn from the roll of material 122. In this position, a portion of the first and the second materials 124 and 126 are disposed adjacent the cutting edge 132. The first and the second materials 124 and 126 then are maneuvered to pass the first and the second materials 124 and 126 over the cutting edge 132 thereby severing a portion of the material extending a distance from the leading edge 134 thereof from the roll of material 122. The portion of the first and the second materials 124 and 126 withdrawn from the roll of material 122 and severed from the roll of material 122 comprise the first and the second sheets of material as described herein.

The first and the second materials 124 and 126 in the roll of material 122 may be connected or unconnected. Further, the roll of material 122 may comprise two rolls of material with one of the rolls of material comprising the first material 124 and the other roll of material comprising the second material 126. In this last-mentioned embodiment, the first material 124 is withdrawn from the first roll of material and the second material 126 is withdrawn from the second roll of material about simultaneously so that the first and the second materials 124 and 126 are provided in a manner as generally shown in FIG. 14 for severing from the first and second rolls of material to provide the first and the second sheets of material as described herein. The term "roll of material" as used herein is intended to encompass tow or more rolls in the manner generally described.

Shown in FIG. 15 is a modified roll of material 122a comprising a first material 124a and a second material 126a with a leading edge 134a. The roll of material 122a is constructed exactly like the roll of material 122 described before, except the roll of material 122a is not disposed in a dispenser constructed like the dispenser 128 shown in FIG. 14. Rather, the roll of material 122a is supported on a generally mounted shaft 140. The first and the second sheets of material 124a and 126a are withdrawn from the roll of material 122a in a manner like that described before in connection with FIG. 14 until a predetermined length of the first and the second materials 124a and 126a have been withdrawn from the roll of material 122a. In this position, a portion of the first and the second materials 124a and 126a are disposed under a knife edge 142. The knife edge 142 is connected to an actuator 144 adapted to move the knife edge 142 in a direction 146 and in a direction 148. When the predetermined length of the first and the second materials 124a and 126a have been withdrawn from the roll of material 122a, the actuator 144 actuates to move the knife edge 142 in the direction 146 to a position wherein the knife edge 142 severingly engages the materials 124a and 126a to severingly cut a portion of the first and the second materials 124a and 126a from the roll of materials 122a to provide the first and the second sheets of material as described herein. The actuator 144 may comprise a hydraulic or pneumatic cylinder or a motor and gear arrangement or any other form of arrangement suitable for moving the knife edge 142 in the directions 146 and 168. After the knife edge 142 has cuttingly severed the desired portion of the first and the second sheets of material 124a and 126a from the roll of material 122a, the actuator 144 is actuated to move the knife edge 142 in the direction 148 to a storage position disposed a distance above the first and the second materials 124a and 126a as opposed to the cutting position previously described.

Figure 16:
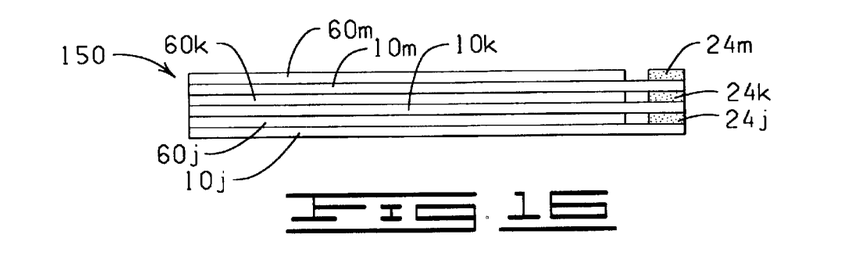
FIG. 16 is a side elevational view of a pad of first and second sheets of material constructed in accordance with the present invention.

Embodiment of FIG. 16

Shown in FIG. 16 is a pad 150 of first sheets of materials designated by the reference numerals 10j, 10k, and 10m in FIG. 16 and a plurality of second sheets of material designated in FIG. 16 by the reference numerals 60j, 60k and 60m. The first sheets of material 10j, 10k and 10m may be constructed like the sheet of material 10 shown in FIG. 1 and described in detail before and the second sheets of material 60j, 60k and 60m may be constructed like the second sheet of material 60 shown in FIG. 4 and described in detail before, or like any of the other first and the second sheets of material described. herein. The first and the second sheets of material 10j, 10k, 10m, 60j, 60k and 60m are connected in the form of a pad 150 with the closure bonding material 24j, 24k and 24m cooperating to connect the first sheets of material 10j, 10k and 10m; in the form of the pad 150. The second sheets of material 60j, 60k and 60m may be connected to the respective first sheets of material 10j, 10k and 10m or may be interleaved between the adjacent first sheets of material 10j, 10k and 10m in the pad 150. In the alternative, the second sheets of material 60j, 60k and 60m may be connected to form the pad 150 with the first sheets of material 10j, 10k and 10m being interleaved in the respective second sheets of material 60j, 60k and 60m and/or connected thereto. In operation, the floral grouping may be placed on the top sheet of material in the pad 150 and the first and the second sheets of material comprising the top sheet of material may be wrapped about the floral grouping, as described in more detail below, and removed from the pad 150. In the alternative, one of the first sheets of material 10j, 10k or 10m along with the adjacent second sheet of material 60j, 60k and 60m may be removed from the pad 150 and then wrapped about the floral grouping or flower pot.

Figure 17:
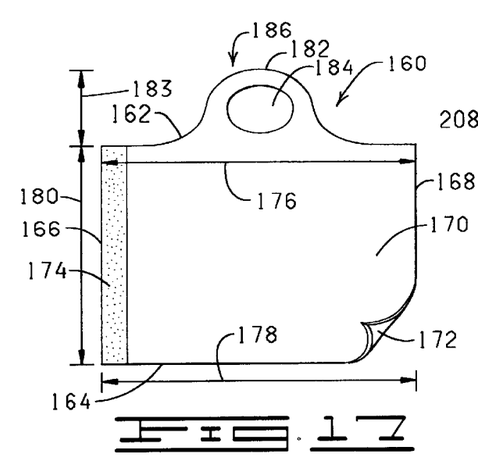
FIG. 17 is a plan view of another first sheet of material constructed in accordance with the present invention.
Figure 18:
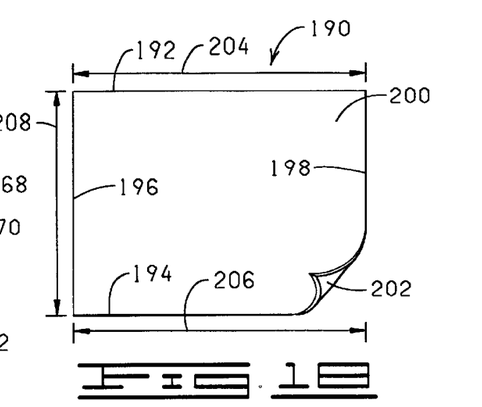
FIG. 18 is a plan view of another second sheet of material constructed in accordance with the present invention.
Figure 19:
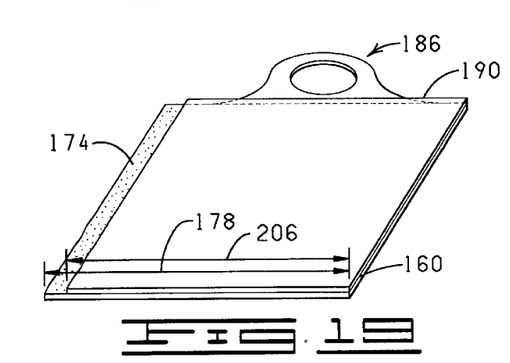
FIG. 19 is a perspective view showing the first and the second sheets of material of FIGS. 17 and 18 disposed upon one another.

The Embodiments of FIGS. 17–19

Shown in FIG. 17 and designated therein by therein the general reference numeral 160 is a sheet of material. The sheet of material 160 has a first end 162, a second end 164, a first side 166, a second side 168, an upper surface 170 and a lower surface 172.

A closure bonding material 174 is disposed on a portion of the upper surface 170 similarly to that shown for the sheet of material 10. As shown in FIG. 17, the closure bonding material 174 is disposed on the upper surface 170 in a strip of closure bonding material 174, although the closure bonding material 174 also could be applied to the upper surface 170 of the sheet of material 160 in the form of spaced apart spots or the closure bonding material 174 also could be disposed on the upper surface 170 of the sheet of material 160 in other geometric forms upon portions of the upper surface 170 as described previously for the sheet of material 10. The sheet of material 160 is exactly the same as the sheet 10 in regards to the thickness and composition of the sheet except for the differences noted below.

For example, the sheet of material 160 may be constructed of a single layer of material or a plurality of layers of the same or different types of materials exactly the same as the sheet 10.

The sheet of material 160 has a first width 176 extending from the first side 166 to the second side 168 located generally near the first end 162, and a second width 178 extending from the first side 166 to the second side 168 and located generally near the second end 164 of the sheet 160. The first width 176 is substantially equal to the second width 178. The sheet of material 160 also has a length 180 extending from the first end 162 to the second end 164 which is sufficiently long to substantially surround and enclose a floral grouping when wrapped about such a floral grouping, which is described in greater detail below.

The sheet of material 160 further has an extension 182 which extends laterally a distance 183 from the first end 162 of the sheet. The extension 182 has an opening 184 located therein and the extension 182 and the opening 184 in the extension 182 together comprise a handle 186. The sheet of material 160 may be further decorated with a decorative pattern (not shown) similar to that shown as pattern 38 on the sheet of material 10.

The sheet of material 160 may be used alone to wrap a floral grouping or plant, or may be used with at least a second sheet when used to wrap a floral grouping, as described for sheet 10 above.

For all intents and purposes, the sheet 160 is identical to the sheet 10 except for the equivalence of the widths 176 and 178 in the sheet 160.

Referring now to FIG. 18, a second sheet of material is designated by the general reference numeral 190. The second sheet 190 is exactly the same as sheet 40 as described above except it is designed to fit a sheet such as sheet 160 rather than a sheet such as sheet 10.

The second sheet of material 190 has a first end 192, a second end 194, a first side 196, a second side 198, an upper surface 200 and a lower surface 202.

The second sheet of material 190 has a first width 204 extending between the first side 196 and the second side 198 and generally near the first end 192 of the second sheet of material 190. The second sheet of material 190 has a second width 206 extending between the first side 196 and the second side 198 and generally near the second end 194 of the second sheet of material 190. The first width 204 of the second sheet of material 190 is substantially equal to the second width 206 of the second sheet of material 190. The second sheet of material 190 has a length 208 which extends from the first end 192 to the second end 194 of the sheet 190.

In general the length 180 of the sheet 160 is substantially equal to the length 208 of the sheet 190. Also, in general the first width 176 of the sheet 160 is wider than the first width 204 of the sheet 190. Also, the second width 178 of the sheet 160 is wider than the second width 206 of the sheet 190. As a result, when the second sheet 190 is disposed upon the first sheet 160 as shown in FIG. 19, the closure bonding material 174 on the sheet 160 is left substantially uncovered by the sheet 190.

In this position, the lower surface 202 of the sheet 190 is disposed upon the upper surface 170 of the sheet 160 in exactly the same way as the lower surface 52 of the second sheet of material 40 is disposed adjacent the upper surface 20 of the first sheet of material 10 as shown in FIG. 3. The first end 192 of the second sheet of material 190 is generally aligned with the first end 162 of the first sheet of material 160, the second end 194 of the second sheet of material 190 is generally aligned with the second end 164 of the first sheet of material 160, the second side 168 of the first sheet of material 160 is generally aligned with the second side 198 of the second sheet of material 190 and the first side 166 of the first sheet of material 160 extends a distance beyond the first side 196 of the second sheet of material 190 so that the closure bonding material 174 on the upper surface 170 of the first sheet of material 160 is exposed and not covered by the second sheet of material 190.

When the second sheet 190 is disposed upon the upper surface 170 of the sheet of material 160 the handle 186 is left uncovered by the second sheet 190, as generally indicated in FIG. 19.

As noted above, for sheet 10, a closure bonding material is disposed on the upper surface 170 of the first sheet of material 160. The closure bonding material 174 may be applied as a strip or as spots or other shapes as described above.

The first sheet of material 160 can be utilized alone or in combination with the second sheet of material 190 to wrap a floral grouping or plant as described above for sheets 10 and 40.

Also as described above for sheet 10 and sheet 40, the first sheet of material 160 or the second sheet of material 190 may be constructed of a single layer of material or a plurality of layers of the same or different types of materials. Any thickness of the sheet may be utilized in accordance with the present invention as long as the sheet of material 160 or 190 may be wrapped or formed about at least a portion of a portion of a flower pot or a floral grouping, as described herein. Additionally, an insulating material such as bubble film, preferably as one of two or more layers, can be utilized in order to provide additional protection for the item wrapped therein.

Figure 20:
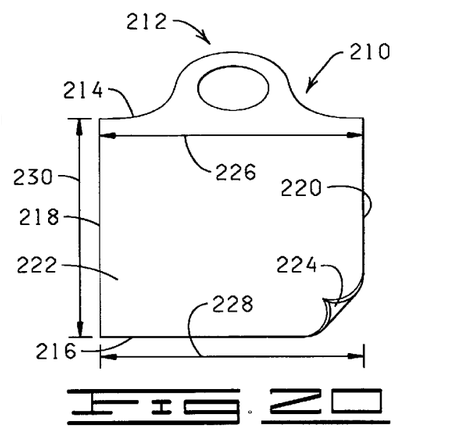
FIG. 20 is a plan view of yet another second sheet of material.
Figures 21, 22A, 22B:
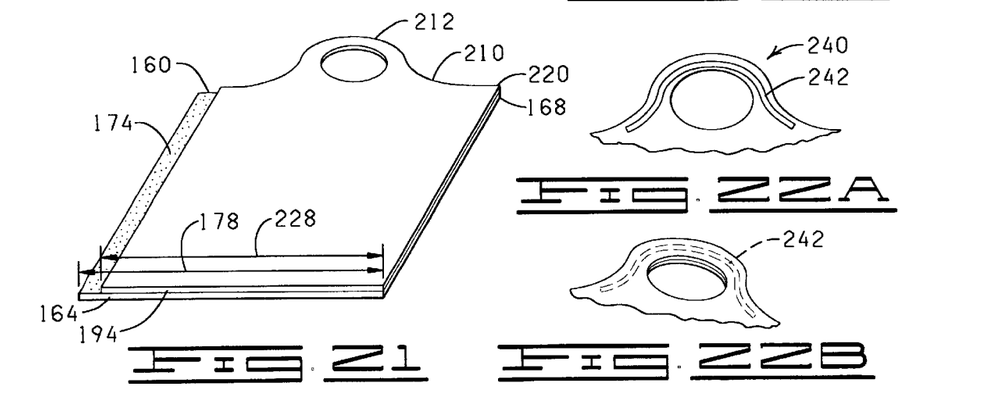
FIG. 21 is a perspective view showing the first and second sheets of material of FIGS. 17 and 20 disposed upon one another.
FIG. 22A is a plan view of a handle having a reinforcing member disposed thereon.
FIG. 22B is a perspective view of a two-layered handle having a reinforcing member disposed between the two layers.

Embodiments of FIGS. 20–21

Referring now to FIGS. 20 and 21, a sheet of material is designated by the general reference numeral 210. The sheet 210 has a handle 212, a first end 214, a second end 216, a first side 218, a second side 220, an upper surface 222 and a lower surface 224. The sheet 210 has a first width 226, a second width 228 and a length 230. The sheet 210 is exactly the same as the sheet 60 with the exception that the first width 76 and the second width 78 of the sheet 60 are unequal, with the second width 78 less than the first width 76, while the first width 226 of the sheet 210 is substantially equal to the second width 228 of sheet 210. Additionally, the first width 226 and the second width 228 of the sheet 210 are less than the first width 176 and the second width 178, respectively, of the sheet 160.

When sheet 210 is overlaid and disposed upon the upper surface 170 of sheet 160, as shown in FIG. 21, the sheet 210 and 170 appear exactly like sheets 160 and 190 in FIG. 19 except that sheet 210 has a handle 212 which is superimposed upon the handle 186 of sheet 160. The closure bonding material 174 is left exposed when sheet 210 is superimposed upon sheet 160 such that the second side 220 of sheet 210 is superimposingly aligned with the second side 168 of sheet 160. Once the sheet 210 has been laid upon the sheet 160, the sheet 210 and sheet 160 are in substantial alignment along each side and end and along the handles 182 and 212. Also as described above in FIGS. 8–12, a bonding material may be applied to either the upper surface of a first sheet of material or to the lower surface of a second sheet of material in a plurality of patches for the purpose of bonding the upper surface of the first sheet to the lower surface of the second sheet.

Embodiments of FIGS. 22A–22B

Referring now fo FIG. 22A is shown a reinforced handle designated by the general reference numeral 240. The reinforced handle 240 is exactly the same as the handles described above, such as those described in FIGS. 1, 4, 7–8, 17 and 20 except that a reinforcing member 242 is applied thereto for the purpose of strengthening the handle 240 when the handle 240 is grasped for the purpose of carrying a floral grouping wrapped within the sheet of material. The reinforcing member 242 may be comprised of plastic, wire, metal, polymer, rubber, fabric, cellulose or any other material suited to the purpose of reinforcing the sheet of material and able to be attached thereto. The reinforcing member 242 may be attached to the surface of the sheet of material by a bonding material such as is defined herein. Alternatively, the reinforcing member 242 may be laminated between a first sheet of material and a second sheet of material when both the first sheet and the second sheet have handles such as shown in FIG. 22B.

Figure 23A:
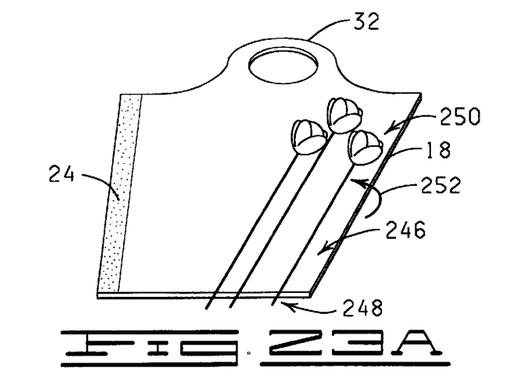
FIG. 23A is a perspective view of a floral arrangement disposed on a sheet of material constructed in accordance with the present invention.
Figure 23B:
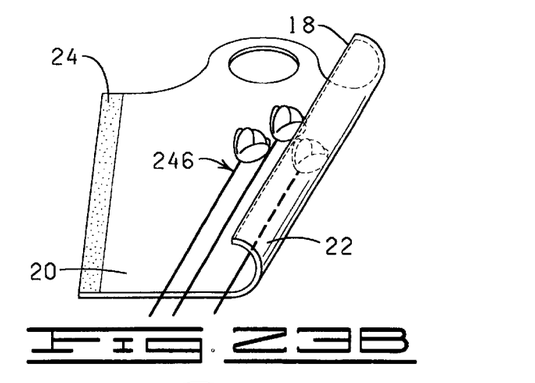
FIG. 23B is a perspective view of the floral arrangement of FIG. 23A being wrapped in one method of wrapping.
Figure 23C:
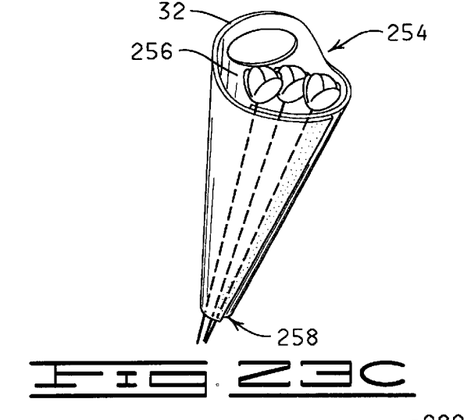
FIG. 23C is a perspective view of the floral arrangement wrapped in a conical fashion.
Figure 24:
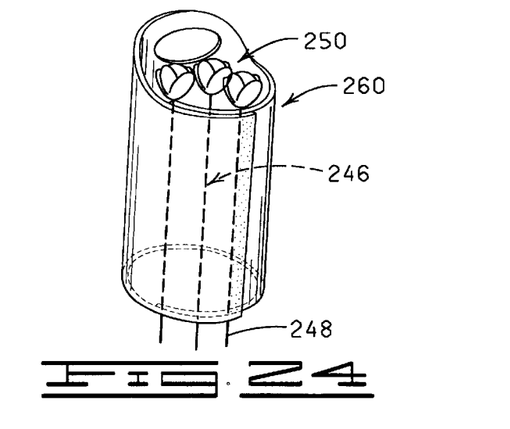
FIG. 24 is a perspective view on another sheet of material having been wrapped about a floral grouping in a cylindrical fashion.

Embodiments of FIGS. 23A–24

As noted above, the present invention contemplates using the sheet of material 10 to wrap a floral grouping. A floral grouping 246 having a stem end 248 and a bloom end 250 (FIG. 23A) is disposed on the upper surface 20 of the sheet of material 10. The sheet of material 10 then is wrapped about the floral grouping 246 by taking the second side 18 of the sheet of material 10 and rolling the sheet of material 10 in a direction 252 about the floral grouping 246 (FIG. 23B). The sheet of material 10 is continued to be rolled about the floral grouping 246 until a portion of the closure bonding material 24 is disposed adjacent a portion of the lower surface 22 of the sheet of material 10 and brought into bonding contact or engagement therewith (FIG. 23C) thereby bondingly connecting the closure bonding material 24 on the upper surface 20 of the sheet of material 10 to a portion of the lower surface 22 of the sheet of material 10 for cooperating to secure the first sheet of material 10 in a wrapped condition about the floral grouping 246 to provide a wrapper 254 wrapped about the floral grouping 246, as shown in FIG. 23C.

In the wrapped condition with the sheet of material 10 wrapped about the floral grouping 246 as shown in FIG. 23C, the wrapper 254 forms a conical shape with an opened upper end 256 and an opened lower end 258. The wrapper 254 covers a portion of the bloom end 250 of the floral grouping 246. A portion of the stem end 248 of the floral grouping 246 extends through the opened lower end 258 of the wrapper 254. The wrapper 254 is tightly wrapped about the stem end 248 of the floral grouping 246. The closure bonding material 24 on the sheet of material 10 may contact and engage some of the stem end 248 of the floral grouping 246 to cooperate in securing the wrapper 254 tightly wrapped about the stem end 248 and to prevent the floral grouping 246 from slipping or moving within the wrapper 254.

At least a portion of the floral grouping 246 is disposed within the wrapper 254. In some applications, the stem end 248 of the floral grouping 246 extends through the open lower end 258 of the wrapper 254, as described before. In some applications, the wrapper is tightly wrapped about the stem end 248 of the floral grouping 246. The bloom end 250 of the floral grouping 246 is disposed near the open upper end 256 of the floral grouping 246 and the bloom end 250 of the floral grouping 246 is visible via the open upper end 256 of the wrapper 254. In some instances, the bloom end 250 of the floral grouping 246 may extend beyond the open upper end 256 of the wrapper 254. In some applications, the upper end 256 of the wrapper 254 may be closed if desired. In some applications, the lower end 258 of the wrapper 254 may be closed if desired.

To form a cylindrically-shaped wrapper, a sheet of material such as sheet 160 may be wrapped about the floral grouping 246 to form a cylindrically shaped wrapper 260 as shown in FIG. 24.

When the floral grouping 246 is wrapped using both a first sheet of material 10 and a second sheet material 40, the floral grouping 246 is disposed on the upper surface 50 of the second sheet of material 40. First and second sheets of material which are placed similarly to the placement shown in FIG. 3 are then wrapped about the floral grouping 246 in substantially the same manner that a single first sheet of material 10 is wrapped about the floral grouping 246 to arrive at a conically or cylindrically wrapped floral grouping as described above whereby the closure bonding material 24 on the first sheet is brought into bonding contact or engagement therewith thereby bondingly connecting the closure bonding material 24 on the upper surface 20 of the first sheet of material 10 to a position of the lower surface 22 of the first sheet of material 10.

When used in the context of wrapping a floral grouping, the second sheet of material 40 is preferably constructed of a relatively rigid, flexible sheet of material capable of being wrapped about the floral grouping 246 whereby the second sheet of material 40 cooperates to add rigidity to the first and the second sheets of material 10 and 40 for cooperating to support the first and the second sheets of material 10 and 40 wrapped about the floral grouping 246 in the form of a wrapper similar in appearance to the wrapper 254 and/or 260 shown in FIGS. 23C and 24. Also, the second sheet of material 40 preferably is constructed of an insulation type of material for providing insulation when the first and the second sheets of material 10 and 40 are wrapped about the floral grouping 246 to form the wrapper. The second sheet of material 40 also preferably is capable of absorbing water so that, when the first and the second sheets of material 10 and 40 are wrapped about the floral grouping 246 to form a wrapper, the second sheet of material 40 is disposed adjacent the floral grouping 246 and absorbs water from the floral grouping 246.

In addition, the second sheet of material 40 may be disposed on the outer surface of the wrapper (not shown), rather than the inner surface of the wrapper adjacent the floral grouping 246, if desired in a particular application.

As will be apparent to one of ordinary skill in the art the method of wrapping a floral grouping as described above using sheet 10 alone or sheets 10 and 40 in combination are equally applicable to the other sheets and sheet combinations described herein and are equally applicable to variations of the sheets and sheet combinations described herein.

Figure 25:
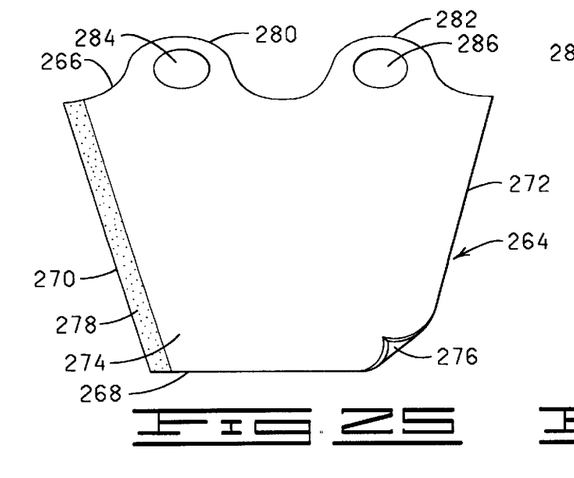
FIG. 25 is a plan view of a sheet of material constructed in accordance with the present invention and having two handles.
Figure 26:
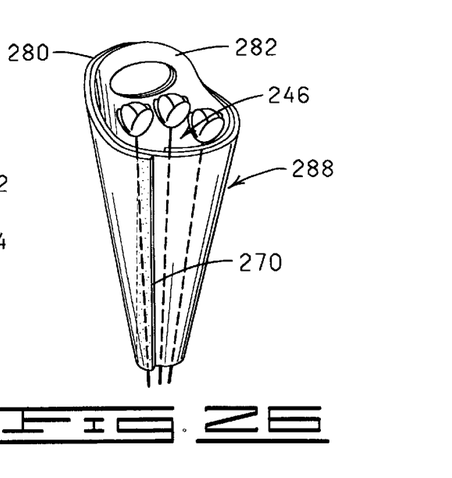
FIG. 26 is a perspective view of the sheet of FIG. 25 used as a wrapper about a floral grouping, the handles superimposed upon one another.

Embodiment of FIGS. 25–26

Shown in FIG. 25 ad designated by the general reference numeral 264 is a sheet of material which is constructed exactly the same as the sheet of material 10 except that the sheet of material 264 has both a first handle and a second handle. The sheet of material 264 has first end 266, a second end 268, a first side 270, a second side 272, an upper surface 274 and a lower surface 276. A closure bonding material 278 is disposed along a portion of the upper surface 274.

Extending from the first end 266 is a first handle 280 and a second handle 282. The first handle 280 has an opening 284 and the second handle has an opening 286. The first handle 280 and the second handle 282 are positioned on the sheet 264 such that when the sheet 264 is wrapped about a floral grouping 246 in the manner described above for FIGS. 23A–23C, the first handle 280 and the second handle 282 are substantially aligned such that the first opening 284 and the second opening 286 are substantially superimposed upon one another as shown in FIG. 26 thereby forming a wrapper 288 having a "double handle" which is stronger and less prone to breaking than would be a single handle.

Figure 27:
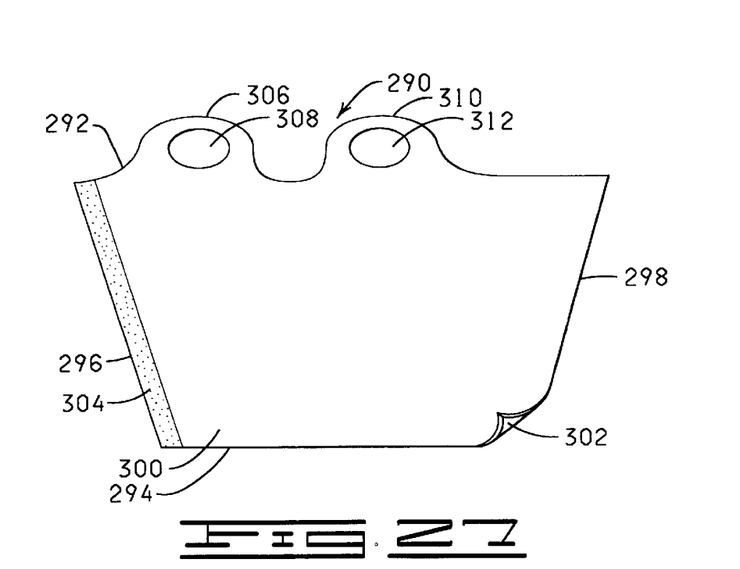
FIG. 27 is a plan view of another sheet of material constructed in accordance with the present invention and having two handles.
Figure 28:
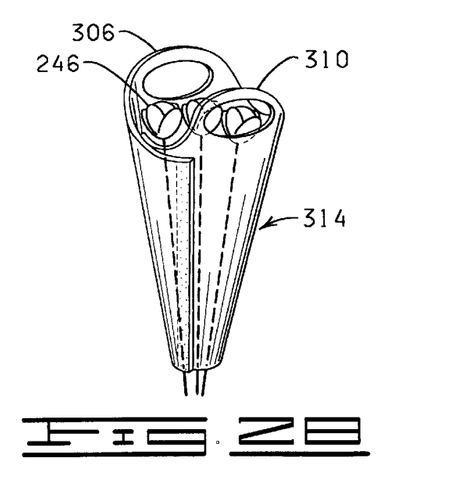
FIG. 28 is a perspective view of the sheet of FIG. 27 used as a wrapper about a floral grouping, the handles opposite one another.

Embodiment of FIGS. 27–28

Shown in FIG. 27 and designated by the general reference numeral 290 is a sheet of material which is constructed exactly the same as the sheet of material 264 as shown in FIG. 25 except that the handles of the sheet 290 are arranged in a different position on the sheet 290. The sheet of material 290 has a first end 292, a second end 294, a first side 296, a second side 298, an upper surface 300, and a lower surface 302. A closure bonding material 304 is disposed along a portion of the upper surface 300.

Extending from the first end 292 is a first handle 306 having an opening 308 and a second handle 310 having an opening 312. The first handle 306 and the second handle 310 are positioned on the sheet 290 such that when the sheet 290 is wrapped about a floral grouping 246 in the manner described above in FIGS. 23A–23C, the first handle 306 and the second handle 310 are positioned substantially opposite one another about the floral grouping 246 as shown in FIG. 28 thereby forming a wrapper 314. In this manner the first handle 306 and the second handle 310 of the wrapper 314 can be grasped simultaneously by a single hand of the carrier of the wrapper 314 thereby reducing the stress applied to either of the handles alone and strengthening the wrapper 314 and its ability to hold the floral grouping 246 without incurring tearing.

The term "bonding material" when used herein means an adhesive, preferably a pressure sensitive adhesive, or a cohesive. Where the bonding material is a cohesive, a similar cohesive material must be placed on the adjacent surface for bondingly contacting and bondingly engaging with the cohesive material. The term "bonding material" also includes materials which are heat sealable and, in this instance, the adjacent portions of the material must be brought into contact and then heat must be applied to effect the seal. The term "bonding material" also includes materials which are sonic sealable and vibratory sealable. The term "bonding material" when used herein also means a heat sealing lacquer which may be applied to the sheet of material and, in this instance, heat, sound waves, or vibrations, also must be applied to effect the sealing.

The term "bonding material" when used herein also means any type of material or thing which can be used to effect the bonding or connecting of the two adjacent portions of the material or sheet of material to effect the connection or bonding described herein. The term "bonding material" also includes ties, labels, bands, ribbons, strings, tape, stapes or combinations thereof. Some of the bonding materials would secure the ends of the material while other bonding material may bind the circumference of the wrapper. Another way to secure the wrapping is to heat seal the ends of the material to another portion of the material. One way to do this is to contact the ends with an iron of sufficient heat to heat seal the material.

The term "bonding material" when used herein also means any heat or chemically shrinkable material, and static electrical or other electrical means, magnetic means, mechanical or barb-type fastening means or clamps, curl-type characteristics of the film or materials incorporated in the sheet of material which can cause the material to take on certain shapes, and any type of welding method which may weld portions of the sheet to itself or to the pot, or to both the sheet itself and the pot.

The term "floral grouping" when used herein means natural or artificial herbaceous or wood plants, taken singly or in combination. The term also means any portion or portions of natural or artificial herbaceous or woody plants including stems, leaves, flowers, blossoms, buds, blooms, cones, or roots, taken singly or in combination, or in groupings of such portions such as bouquets.

The sheet of material used herein may further comprise at least one scent (not shown). Examples of scents utilized herein include (but are not limited to) floral scents (flower blossoms, or any portion of a plant), food scents (chocolate, sugar, fruits), herb or spice scents (cinnamon), and the like. Additional examples of scents include flowers (such as roses, daisies, lilacs), plants (such as fruits, vegetables, grasses, trees), foods (for example, candies, cookies, cake), food condiments (such as honey, sugar, salt), herbs, spices, woods, roots, and the like, or any combination of the foregoing. Such scents are known in the art, and are commercially available.

The scent may be disposed upon the sheet of material 10 by spraying the scent thereupon, painting the scent thereupon, brushing the scent thereupon, lacquering the scent thereupon, immersing the sheet of material in a scent-containing liquid, exposing the sheet of material to scent-containing gas, or any combination thereof.

The scent may be contained with a laquer, or other liquid, before it is disposed upon the sheet of material 10. The scent may also be contained within a dye, ink, and/or pigment (not shown). Such dyes, inks and pigments are known in the art, and are commercially available, and may be disposed upon or incorporated in the sheet of material 10 by any method described herein or known in the art.

Changes may be made in construction and the operation of the various components, elements and assemblies described herein or in the steps or the sequence of steps of the methods described herein without departing from the spirit and scope of the invention as defined in the following claims.

What is claimed is:

1. A wrapper for wrapping a floral grouping having a stem end and a bloom end, comprising:
   a sheet of material having a first surface, a second surface, a first end, a second end, a first side and a second side, the sheet of material having an opening proximate the first end thereof so as to form a handle, the sheet of material sized to be wrapped around the floral grouping with the handle positioned near the bloom end of the floral grouping and a portion of the stem end of the floral grouping extending beyond the second end of the sheet of material; and
   a bonding material disposed on the sheet of material so that the bonding material is bondingly engageable to another portion of the sheet of material upon wrapping the sheet of material about the floral grouping to secure the sheet of material about the stem end of the floral grouping such that the weight of the floral grouping is substantially carried by the stem end of the floral grouping upon an individual grasping the handle of the sheet of material and lifting the combination of the wrapper and the floral grouping.

2. The wrapper of claim 1 wherein the bonding material is positioned generally between the first end and the second end of the sheet of material along only one of the first side and the second side.

3. The wrapper of claim 1 wherein the sheet of material has a substantially uniform width.

4. The wrapper of claim 1 wherein the sheet of material has a tapered width.

5. The sheet of material of claim 1 wherein the handle of the sheet of material further comprises a reinforcing member for providing additional strength to the handle.

6. The sheet of material of claim 1 wherein the sheet of material comprises a portion of a roll of material wherein the sheet of material can be detachably or severingly removed from the roll of material.

7. The wrapper of claim 1 wherein the sheet of material has a second opening positioned relative to the first opening such that the second opening is alignable with the first opening in a superimposed relationship upon wrapping the sheet of material about the floral grouping.

8. The wrapper of claim 1 wherein the sheet of material has a second opening positioned relative to the first opening such that the second opening is alignable with the first opening in a opposing relationship upon wrapping the sheet of material about the floral grouping.

9. A wrapper for wrapping a floral grouping having a stem end and a bloom end, comprising:

a sheet of material having a first surface, a second surface, a first end, a second end, a first side, and a second side, the sheet of material sized to be wrapped around the floral grouping;

a handle formed on the first end of the sheet of material such that the handle is positioned near the bloom end of the floral grouping when the sheet of material is wrapped around the floral grouping; and a bonding material disposed on the sheet of material so that the bonding material is bondingly engageable to another portion of the sheet of material upon wrapping the sheet of material around the floral grouping to secure the sheet of material about the stem end of the floral grouping such that the weight of the floral grouping is substantially carried by the stem end of the floral grouping upon an individual grasping the handle of the sheet of material and lifting the combination of the wrapper and the floral grouping while the bloom end is at least partially uncovered so as to be viewable.

10. The wrapper of claim 9 wherein the bonding material is positioned generally between the first end and the second end of the sheet of material along only one of the first side and the second side.

11. The wrapper of claim 9 wherein the sheet of material has a substantially uniform width.

12. The wrapper of claim 9 wherein the sheet of material has a tapered width.

13. The wrapper of claim 9 further comprising:

a second handle formed on the first end of the sheet of material such that the second handle is alignable with the first handle in a superimposed relationship upon wrapping the sheet of material about the floral grouping.

14. The wrapper of claim 9 further comprising:

a second handle formed on the first end of the sheet of material such that the second handle is alignable with the first handle in an opposing relationship upon wrapping the sheet of material about the floral grouping.

* * * * *

UNITED STATES PATENT AND TRADEMARK OFFICE
CERTIFICATE OF CORRECTION

PATENT NO. : 6,415,546 B2
DATED : July 9, 2002
INVENTOR(S) : Donald E. Weder et al.

It is certified that error appears in the above-identified patent and that said Letters Patent is hereby corrected as shown below:

Title page, Item 54 and Column 1, line 1,
Title, after "GROUPING" and before "WITH" add -- WRAPPER --.

Drawings,
Delete Figures 8 and 9 and substitute therefore new figures 8 and 9 as follows:

Delete figure 11 and substitute therefore new figures 11 as follows:

Column 4,
Line 34, delete "may. be" and substitute therefore -- maybe --.
Line 38, delete the first occurrence of "."

Column 7,
Line 29, after "material" and before "is" add -- 40 --.
Line 49, after "material" add -- 10 --.

Column 10,
Line 6, delete "long" and substitute therefore -- along --.

Column 11,
Line 32, delete "26f" and substitute therefore -- 60f --.

UNITED STATES PATENT AND TRADEMARK OFFICE
CERTIFICATE OF CORRECTION

PATENT NO. : 6,415,546 B2
DATED : July 9, 2002
INVENTOR(S) : Donald E. Weder et al.

It is certified that error appears in the above-identified patent and that said Letters Patent is hereby corrected as shown below:

Column 17,
Line 1, delete "182" and substitute therefore -- 186 --.

Column 19,
Line 3, after "handle" add -- 280 and 282 --.
Line 9, after "handle" and before "has" add -- 282 --.

Signed and Sealed this

Twenty-fourth Day of August, 2004

JON W. DUDAS
*Director of the United States Patent and Trademark Office*